W. M. LAMB.
Tool.
No. 203,052. Patented April 30, 1878.
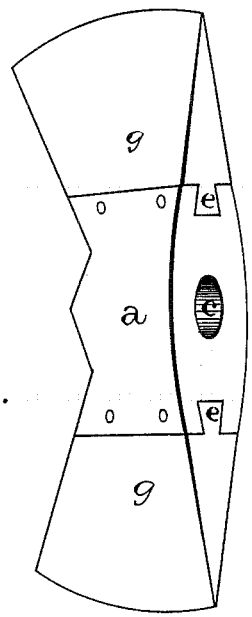
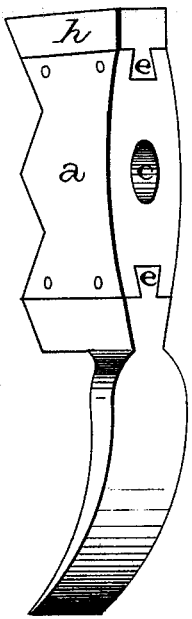
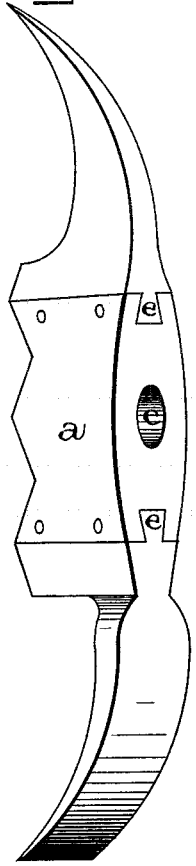

UNITED STATES PATENT OFFICE.

WILLIAM M. LAMB, OF STANARDSVILLE, VIRGINIA.

IMPROVEMENT IN TOOLS.

Specification forming part of Letters Patent No. 203,052, dated April 30, 1878; application filed March 21, 1878.

*To all whom it may concern:*

Be it known that I, WILLIAM M. LAMB, of Stanardsville, in the county of Greene and State of Virginia, have invented certain new and useful Improvements in Axes and other Tools; and I do hereby declare the following to be a full, clear, and exact description of the invention, such as will enable others skilled in the art to which it pertains to make and use it, reference being had to the accompanying drawings, which form part of this specification.

My invention relates to an improvement in axes and other tools; and it consists in making a metallic eye for a handle and forming a dovetailed groove in each end of the eye, for the purpose of inserting various tools, and thus make the one eye and handle answer for a variety of uses, as will be more fully described hereinafter.

Figure 1 represents an edge view of the eye alone. Figs. 2, 3, and 4 represent the eye in perspective, having a number of tools attached thereto.

$a$ represents an eye, made like that of an ax, and having a hole, $c$, through its center to receive a handle, and a dovetailed groove, $d$, in each end. Into these dovetailed grooves are to be inserted the similarly-shaped tenons or flanges $e$, made upon one end of variously-shaped tools, as shown.

When it is desired to use an ax alone the two blades $g$ may be slipped into position, and secured by suitable screws, rivets, or other devices that will allow the blades to be readily detached. If preferred, but a single ax-blade $g$ will be used, and then the blunt or square block $h$, for hammering or driving, will be used upon the other end.

In this manner, by removing one tool and replacing it by another, the eye can be used for a pick and mattock, an ax, a hoe, an adz, or any tool, thus saving the expense of buying more than the various tools to attach to the single eye.

I am aware that an ax having two removable bits, that are fastened to the ends of the eye by means of soft-metal wedges, as shown in the patent to J. O. Rollins, November 28, 1876, is not new; and this I disclaim.

I am also aware that a head for mill-picks having a socket in each end for a tool that is placed horizontally therein, and which is held on by a transverse pin or key, is not new; and this I disclaim.

I am further aware that an ax-eye made in two halves is old; and this I also disclaim.

Having thus described my invention, I claim—

The eye $a$, having the hole $c$ to receive a handle, and the dovetail groove $d$ in each end to receive variously-shaped tools, each one of the said tools being provided with the dovetail tenons or flanges $e$, and then fastened in place by means of screws, substantially as shown and described.

In testimony that I claim the foregoing I have hereunto set my hand this 20th day of March, 1878.

his
WM. M. × LAMB.
mark.

Witnesses:
R. M. BARR,
F. A. LEHMANN.